United States Patent
Murray

(10) Patent No.: US 12,234,019 B2
(45) Date of Patent: Feb. 25, 2025

(54) CABIN BLOWER SYSTEM

(71) Applicant: ROLLS-ROYCE plc, London (GB)

(72) Inventor: Christopher A Murray, Nottingham (GB)

(73) Assignee: Rolls-Royce plc

( * ) Notice: Subject to any disclaimer, the term of this patent is extended or adjusted under 35 U.S.C. 154(b) by 185 days.

(21) Appl. No.: 18/045,857

(22) Filed: Oct. 12, 2022

(65) Prior Publication Data

US 2023/0132101 A1 Apr. 27, 2023

(30) Foreign Application Priority Data

Oct. 26, 2021 (GB) ..................................... 2115352

(51) Int. Cl.
| | | |
|---|---|---|
| *B64D 13/06* | (2006.01) | |
| *F02C 7/32* | (2006.01) | |
| *F02C 7/36* | (2006.01) | |

(52) U.S. Cl.
CPC ............... *B64D 13/06* (2013.01); *F02C 7/32* (2013.01); *F02C 7/36* (2013.01); *B64D 2013/0648* (2013.01)

(58) Field of Classification Search
CPC ........ B64D 13/06; B64D 13/0603; F02C 7/32
See application file for complete search history.

(56) References Cited

U.S. PATENT DOCUMENTS

| | | | | |
|---|---|---|---|---|
| 4,300,806 A | * | 11/1981 | Heshmat | ............... F16C 17/042 384/103 |
| 5,136,837 A | * | 8/1992 | Davison | .................... F02C 7/32 60/785 |
| 2004/0179961 A1 | | 9/2004 | Pugnet et al. | |
| 2004/0261428 A1 | | 12/2004 | Murry et al. | |
| 2015/0275769 A1 | | 10/2015 | Foutch et al. | |
| 2016/0167789 A1 | * | 6/2016 | Knight | .................... B64D 31/14 454/71 |
| 2017/0096943 A1 | * | 4/2017 | Sheridan | ................. F02C 3/107 |
| 2018/0051745 A1 | * | 2/2018 | Himmelmann | ........ F01D 25/162 |

FOREIGN PATENT DOCUMENTS

| | | |
|---|---|---|
| EP | 3121449 A1 | 1/2017 |
| EP | 3208195 A1 | 8/2017 |
| EP | 3517437 A1 | 7/2019 |
| EP | 3584165 A1 | 12/2019 |
| EP | 4001115 A1 | 5/2022 |
| JP | 2003166554 A2 | 6/2003 |
| WO | 2020104062 A1 | 5/2020 |

OTHER PUBLICATIONS

European Search Report dated Feb. 16, 2023, issued in EP Patent Application No. 22197613.7.
Great Britian search report dated Jan. 19, 2022, issued in GB Patent Application No. 2115352.3.

* cited by examiner

*Primary Examiner* — Gerald L Sung
(74) *Attorney, Agent, or Firm* — Barnes & Thornburg LLP

(57) ABSTRACT

A cabin blower system, for an aircraft, comprising: a cabin blower compressor, for compressing air for delivery to a cabin of an aircraft, comprising a compressor drive shaft running on a contactless bearing system; and a transmission comprising an input and an output, the input being arranged to receive power from an engine of the aircraft and the output being arranged to mechanically drive the cabin blower compressor, wherein the output of the transmission is mechanically coupled with the compressor drive shaft via a flexible drive coupling.

12 Claims, 6 Drawing Sheets

CABIN BLOWER SYSTEM

CROSS-REFERENCE TO RELATED APPLICATIONS

This specification is based upon and claims the benefit of priority from United Kingdom Patent Application No. 2115352.3, filed on 26 Oct. 2021, the entire contents of which are incorporated herein by reference.

BACKGROUND

Technical Field

This disclosure concerns cabin blower systems for aircraft. The disclosure also concerns gas turbine engines having cabin blower systems, aircraft having cabin blower systems and methods of operating cabin blower systems.

Description of the Related Art

Cabin pressurisation systems are used to pressurise the cabins of aircraft, and possibly to provide other functions such as wing anti- or de-icing. One type of cabin pressurisation system is a so-called cabin blower system. A cabin blower system includes a dedicated air compressor and is typically driven by one or more associated gas turbine engines of the aircraft. The gas turbine engine may be used to drive a cabin blower compressor in a number of ways (e.g. using electrical power generated by the engine or mechanically). Where mechanical driving of the compressor is employed, drive is typically taken from a shaft of the gas turbine engine via an accessory gearbox.

A means of varying the speed of the drive delivered to the compressor may also be required, as it may not be desirable for the cabin air flow and pressure to be determined by the particular operating point of the gas turbine engine at any particular moment. Therefore, a transmission such as a continuously variable transmission may be disposed in the drive path between the accessory gearbox and the compressor. Such a system may ensure that regardless of engine operating point and ambient air pressure the cabin air flow and pressure can be maintained within acceptable limits.

A problem with some previous cabin pressurisation systems has been the potential contamination of the air supplied to the cabin, for example contamination with oil.

SUMMARY

A first aspect provides a cabin blower system, for an aircraft, comprising: a cabin blower compressor, for compressing air for delivery to a cabin of an aircraft, comprising a compressor drive shaft running on a contactless bearing system; and a transmission comprising an input and an output, the input being arranged to receive power from an engine of the aircraft and the output being arranged to mechanically drive the cabin blower compressor, wherein the output of the transmission is mechanically coupled with the compressor drive shaft via a flexible drive coupling.

By employing a contactless bearing system, the chance of the air being delivered to the cabin of the aircraft being contaminated, e.g. with oil, may be reduced or even eliminated.

The contactless bearing system may take the form of an air bearing system or a magnetic bearing system. In some embodiments, the contactless bearing system comprises an aerostatic bearing system.

In a typical mechanical bearing system, an inner race is surrounded by and arranged concentrically to an outer race. The inner race and the outer race may be mechanically separated by a fixed distance by a plurality of bearings. The plurality of bearings typically requires a lubricant such as an oil to reduce friction between the bearings and the inner and outer race.

In an air bearing system, a cushion of air holds an inner race away from an outer race. The air bearing system may comprise an air foil bearing system.

In a magnetic bearing system, transverse magnetic forces are developed and controlled to overcome gravity and hold an inner race centrally relative to an outer race.

The inner race may be the drive shaft of the cabin blower compressor.

The use of a contactless bearing system in the cabin blower compressor eliminates a potential source of contamination, because no oil or other similar lubricant is required in a contactless bearing system. Consequently, there may be a reduced risk of contaminated air being delivered to the cabin of the aircraft.

The transmission may comprise a continuously variable transmission.

A mechanical bearing system may be disposed near to or at the output of the transmission. The output of the transmission may comprise an end of a transmission drive shaft. The transmission drive shaft may run on a mechanical bearing system.

The mechanical bearing system may be disposed near to or at the flexible drive coupling. The flexible drive coupling may be at one end rigidly affixed to the transmission drive shaft running on the mechanical bearing system, and at its other end rigidly affixed to the compressor drive shaft running on the contactless bearing system.

The lateral stiffness of the mechanical bearing system, if present, may be greater than the lateral stiffness of the contactless bearing system. The lateral stiffness of the contactless bearing system may be greater than the lateral stiffness of the flexible drive coupling. For instance, lateral may be used herein to describe one or more axes arranged substantially perpendicularly to the longitudinal axis of the output, e.g. the transmission drive shaft, and the compressor drive shaft.

The axial stiffness of the mechanical bearing system, if present, may be greater than the axial stiffness of the contactless bearing system. The axial stiffness of the contactless bearing system may be greater than the axial stiffness of the flexible drive coupling. For instance, axial may be used herein to describe a direction parallel to the longitudinal axis of the transmission drive shaft and the compressor drive shaft.

The flexible drive coupling may be disposed at any suitable location between the transmission output and the cabin blower compressor. The flexible drive coupling may be embedded in the centre of a rotor (e.g. a high speed wheel rotor) of a cabin blower compressor system or placed at an end of the compressor drive shaft, e.g. at an end of a high speed wheel rotor shaft.

In use, the transmission drive shaft may be configured to rotate concentrically to the compressor drive shaft and/or at least a portion of the contactless bearing system. As a consequence of tolerance stack ups, the transmission drive shaft may run out of true and rotate non-concentrically with a contactless bearing system which does not use a flexible drive coupling. Running out of true and rotating non-concentrically may cause unequal pressure distribution around the circumferential air gap of the contactless bearing system and uneven heat generation which may cause a local hot spot. An increase in air cooling flow rate may therefore be required to maintain satisfactory contactless bearing system temperatures.

The flexible drive coupling may provide for the correction of misalignment between the output, e.g. the transmission drive shaft, and the contactless bearing system. In use, the lower lateral stiffness of the flexible drive coupling, in relation to the lateral stiffness of the contactless bearing system, may result in the flexible drive coupling continually flexing through its rotation to correct the misalignment between the output and the contactless bearing system caused by tolerance stack ups. As such, the transmission drive shaft will run concentric to the contactless bearing system. In such a system there may be more uniform pressure distribution around the circumferential air gap of an air foil bearing system, and a uniform temperature profile at a reduced temperature level. Therefore, there may be a reduction in the required cooling air mass flow rate to maintain the contactless bearing system at an acceptable temperature level, which may have a positive effect on specific fuel consumption.

By correcting misalignments between the transmission drive shaft and the contactless bearing system, the flexible drive coupling may reduce vibration transmissibility between the transmission and the cabin blower compressor.

In some embodiments the contactless bearing system comprises an air foil bearing system.

The air foil bearing system may comprise a thrust runner 111. The thrust runner 111 may comprise a disc feature disposed on an air foil bearing rotor shaft. The thrust runner 111 may have a larger outer diameter than the outer diameter of a rotor arranged to interface with radial air foil bearing shells. The thrust runner 111 may be at least partially axially constrained by the generation of an air film caused by the rotation of the thrust runner 111, in use, against the thrust air foil bearings. There may be provided a thrust air foil bearing disposed on both sides of the thrust runner 111. The static (non-rotating) elements of each thrust air foil bearing may be described as a 'top foil' and one or more 'bump foils'.

The flexible drive coupling may remove or at least mitigate shaft misalignments that would hamper the performance, durability and robustness of the contactless bearing system and/or the cabin blower system.

The flexible drive coupling may comprise a form metal bellows arrangement. For example, the flexible drive coupling may comprise a diaphragm, a flexible beam, a flexible jaw pin and bush, a disc pack, a grid coupling, a spring or a magnetic arrangement.

The cabin blower system may further comprise: a reversible variator arranged to receive power from the gas turbine engine and to output mechanical power to a second transmission input, the reversible variator being operable to output in both forward and reverse directions of rotation; and a controller configured to control an output speed and direction of rotation of the reversible variator.

The speed of the transmission output may be a function of a speed of the first transmission input, a speed of the second transmission input and the direction of rotation of the variator output, the second transmission input increasing the speed of the transmission output when the variator output rotates in the forward direction and reducing the speed of the transmission output when the variator output rotates in the reverse direction.

The controller may be configured so that, during a start-up process of the cabin blower system, the variator output is controlled to rotate in the reverse direction until a start-up threshold condition is satisfied. When the start-up threshold condition is satisfied, the variator output direction is reversed to rotate in the forward direction.

The cabin blower system may further comprise a disconnect arrangement for selectively disconnecting the cabin blower compressor from the gas turbine engine. The disconnect arrangement, or one or more additional disconnect arrangements, may additionally or alternatively connect the transmission and/or variator from the gas turbine engine. Providing a disconnect arrangement, for example a clutch arrangement or an electro-mechanical disconnect arrangement, allows isolation of blower system components in case of faults or operational issues. Furthermore, in some implementations the variator may have a minimum input speed below which it cannot generate a useful output. Thus, a disconnect arrangement may be used to prevent the connection of the rotating engine shaft(s) to the cabin blower compressor (or to the first transmission input and the variator input) until a minimum variator input speed is reached. This may be used to avoid a 'dead zone' of operation in which the variator output cannot oppose the first transmission input and in which some bearing wear may take place.

The variator may receive mechanical power or electrical power from the gas turbine engine. For example, the variator may receive electrical power from a generator coupled to one of the shafts of the gas turbine engine, for example a permanent magnet alternator of the gas turbine engine. Alternatively, the cabin blower system may be treated as an aircraft accessory rather than an engine system, in which case the variator may receive electrical power from an aircraft electrical system, which would also generate its electrical power by connection to one or more shafts of one or more gas turbine engines of the aircraft.

The transmission may be a summing gearbox. The transmission may be a summing epicyclic gearbox.

A second aspect provides a drive transfer assembly comprising: a first drive shaft running on a contactless bearing system; a second drive shaft; and a flexible drive coupling; wherein the first drive shaft and the second drive shaft are connected via the flexible drive coupling; and wherein the flexible drive coupling comprises a lower lateral stiffness and/or a lower axial stiffness than the contactless bearing system.

The first drive shaft and the second drive shaft may be axially aligned with one another.

The second drive shaft may run on a mechanical bearing system. The flexible drive coupling may have a lower lateral stiffness and/or a lower axial stiffness than the mechanical bearing system.

The first drive shaft running on the contactless bearing system may provide an input or an output of the drive assembly. The second drive shaft may provide the other of the input or the output of the drive assembly.

In some embodiments, the first drive shaft running on the contactless bearing system provides the input of the drive assembly and the second drive shaft provides the output of the drive assembly. In some embodiments, the first drive shaft running on the contactless bearing system provides the output of the drive assembly and the second drive shaft provides the input of the drive assembly.

The contactless bearing system, the mechanical bearing system, if present, and the flexible drive coupling may be arranged to provide a single shaft drive assembly.

In some embodiments, the contactless bearing system comprises an air bearing system or a magnetic bearing system. In some embodiments, the contactless bearing system may comprise an air foil bearing system. In some embodiments, the contactless bearing system comprises an aerostatic bearing system.

The flexible drive coupling may comprise a form metal bellows arrangement. For example, the flexible drive coupling may comprise a diaphragm, a flexible beam, a flexible jaw pin and bush, a disc pack, a grid coupling, a spring or a magnetic arrangement.

As noted elsewhere herein, the present disclosure may relate to a gas turbine engine. Such a gas turbine engine may comprise an engine core comprising a turbine, a combustor, a compressor, and a core shaft connecting the turbine to the compressor.

Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to a third aspect, there is provided an aircraft comprising a cabin blower system according to the first aspect or a drive assembly according to the second aspect.

The person skilled in the art will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Examples are described below with reference to the accompanying drawings, in which.

DETAILED DESCRIPTION

Figure 1:
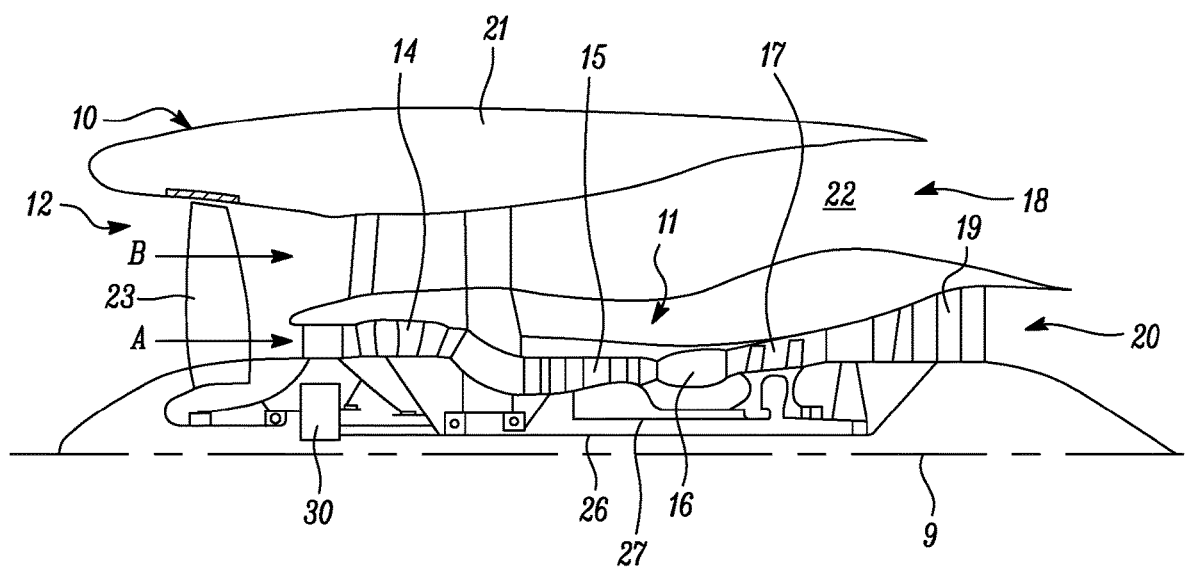
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
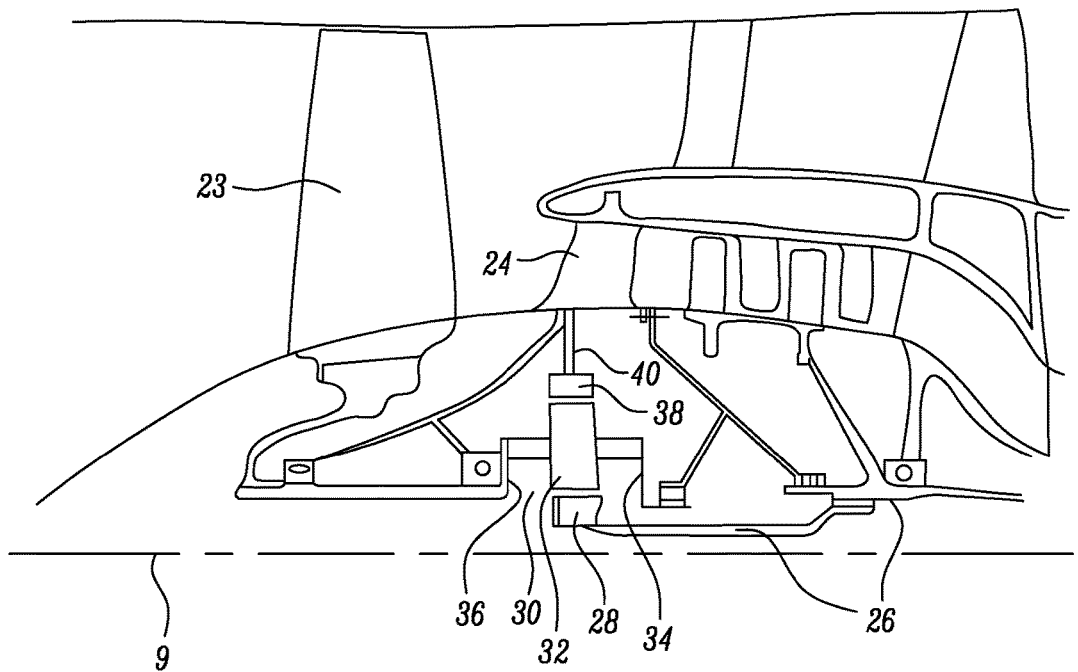
FIG. 2 is a close-up sectional side up view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
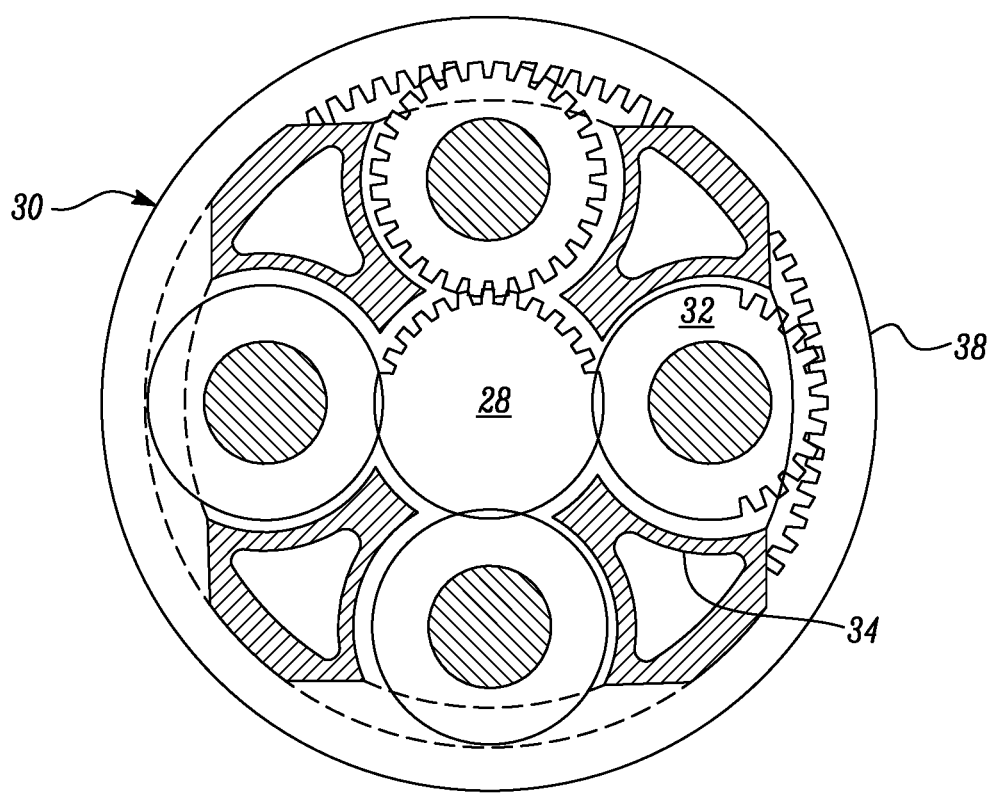
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10.

By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
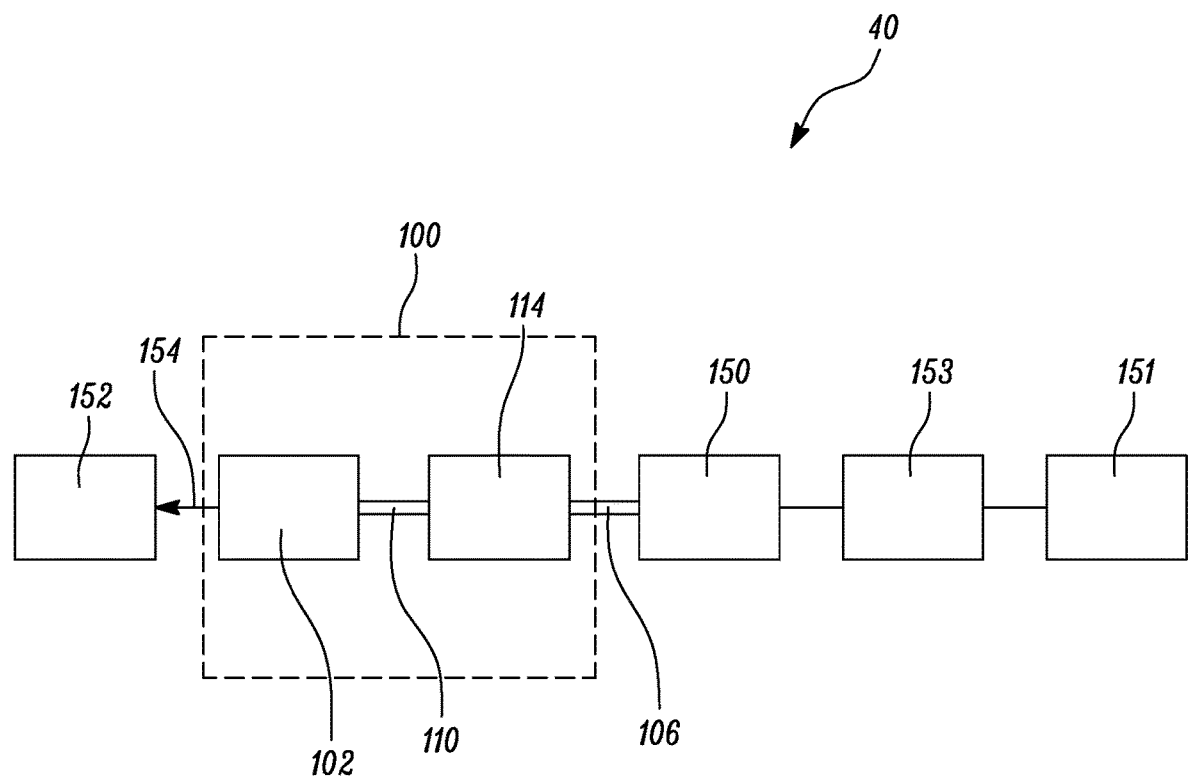
FIG. 4 is a schematic cross-section of a portion of a cabin blower system.

FIG. 4 shows schematically a system 40 for use on an aircraft.

The system 40 comprises a gas turbine engine 151. In some embodiments, the gas turbine engine 151 may be a gas turbine engine 10 as described above.

Drive is taken from a shaft of the gas turbine engine 151 via an accessory gearbox 153. A transmission 150 is mechanically coupled to the accessory gearbox 153. In some implementations, the transmission 150 may be a continuously variable transmission.

A cabin blower system, indicated generally by the dashed line 100, operates to take drive from an output of the transmission in the form of a transmission drive shaft 106 to drive mechanically a cabin blower compressor 102. The cabin blower compressor 102 is arranged to compress air for delivery as an air stream 154 to a cabin 152 of an aircraft.

In the cabin blower system 100, a flexible drive coupling 114 mechanically couples the transmission drive shaft 106 to a compressor drive shaft 110. The compressor drive shaft 110 runs on a contactless bearing system, as will be described in more detail below with reference to FIG. 5.

Figure 5:
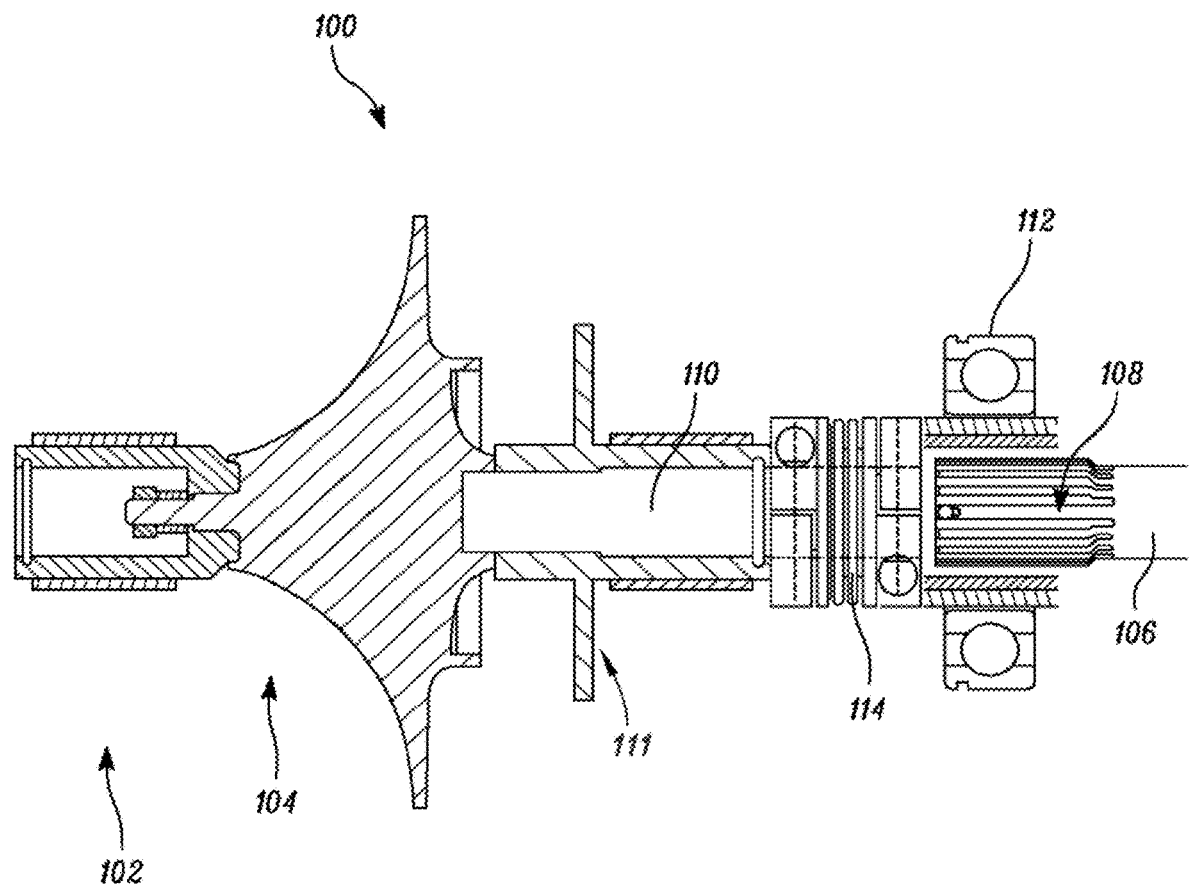
FIG. 5 is a schematic drawing of a cabin blower system.

A portion of the cabin blower system 100 is shown in more detail in FIG. 5.

An output 108 comprises an end portion of the transmission drive shaft 106. The transmission drive shaft 106 runs on a mechanical bearing system 112.

The output 108 is mechanically coupled to the compressor drive shaft 110 via the flexible drive coupling 114. The compressor drive shaft 110 drives the compressor 102.

The compressor drive shaft 110 runs on a contactless bearing system 104. In the illustrated example, the contactless bearing system 104 comprises an air bearing system in the form of an air foil bearing system. The compressor drive shaft includes a centrifugal compressor and a plurality of rotor shaft elements that are arranged to interface with one or more radial air foil bearings and one or more thrust air foil bearings. The radial air foil bearing(s) and the thrust air foil bearing(s) are not shown in FIG. 5.

The compressor drive shaft 110 may be formed of one or more compressor drive shaft portions. Alternatively, the compressor drive shaft 110 may be made as a single piece.

The contactless bearing system 104 may be disposed relatively near to the flexible drive coupling 114. The mechanical bearing system 112 may be disposed relatively near to the flexible drive coupling 114.

The lateral stiffness of the mechanical bearing system 112 is greater than the lateral stiffness of the contactless bearing system 104. The lateral stiffness of the contactless bearing system 104 is greater than the lateral stiffness of the flexible drive coupling 114.

The axial stiffness of the mechanical bearing system 112 is greater than the axial stiffness of the contactless bearing system 104. The axial stiffness of the contactless bearing system 104 is greater than the axial stiffness of the flexible drive coupling 114.

The flexible drive coupling 114 has a lower axial stiffness than the contactless bearing system 104. The flexible drive coupling 114 has a lower lateral stiffness than the contactless bearing system 104.

The flexible drive coupling 114 has a lower axial stiffness than the mechanical bearing system 112. The flexible drive coupling 114 has a lower lateral stiffness than the mechanical bearing system 112.

As a consequence of tolerance stack ups, in use, the transmission drive shaft 106 may be urged to run out of true and rotate non-concentrically with the compressor drive shaft 110.

The flexible drive coupling 114 provides a means for correcting misalignment between the transmission drive shaft 106 and the compressor drive shaft 110. In use, the lower lateral stiffness of the flexible drive coupling 114, in relation to the lateral stiffness of the contactless bearing system 104, allows the flexible drive coupling 114 to continually flex through its rotation to correct any misalignment between the transmission drive shaft 106 and the compressor drive shaft 110 caused by tolerance stack ups. As such, the compressor rotor shaft will be able to run concentric and parallel with the contactless bearing system.

The contactless bearing system 104 may take the form of an air bearing system or a magnetic bearing system. The air bearing system may be an air foil bearing system or an aerostatic bearing system.

The flexible drive coupling 114 may comprise a form metal bellows arrangement. In some embodiments, the flexible drive coupling 114 may comprise a diaphragm, a flexible beam, a flexible jaw pin and bush, a disc pack, a grid coupling, a spring or a magnetic arrangement.

Figure 6:
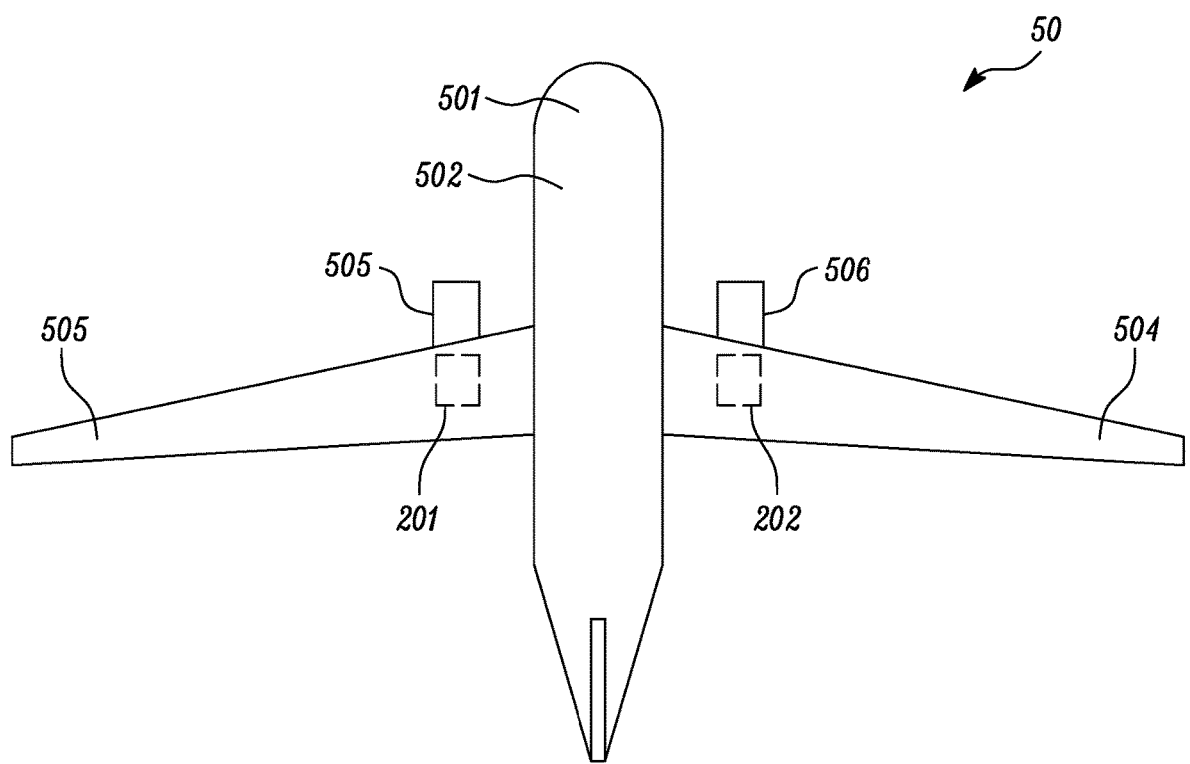
FIG. 6 is an aircraft including two gas turbine engines and two associated cabin blower systems.

FIG. 6 shows schematically an aircraft 50. The aircraft 50 has a fuselage 501 with a cabin 502 therein. A first wing 503 and a second wing 504 extend away from the fuselage 501 in opposite directions. A first gas turbine engine 505 is connected to the first wing 504. A second gas turbine engine 506 is connected to the second wing 505. The first gas turbine engine 505 and/or the second gas turbine engine 506 may be any gas turbine engine for an aircraft. For example, the first gas turbine engine 505 and/or the second gas turbine engine 506 may be similar to or the same as the gas turbine engine 10 disclosed herein.

A first cabin blower system 201 according to the present disclosure is associated with the first gas turbine engine 505. The first cabin blower system 200 operates to compress and deliver air to the cabin 502 of the aircraft 50.

A second cabin blower system 202 according to the present disclosure is associated with the second gas turbine engine 506. The second cabin blower system 202 operates to compress and deliver air to the cabin 502 of the aircraft 50.

The first cabin blower system 201 and/or the second cabin blower system 202 may be any cabin blower system disclosed herein. For instance, the first cabin blower system 201 and/or the second cabin blower system 202 may be similar to or the same as the cabin blower system 100 disclosed herein.

Figure 7:
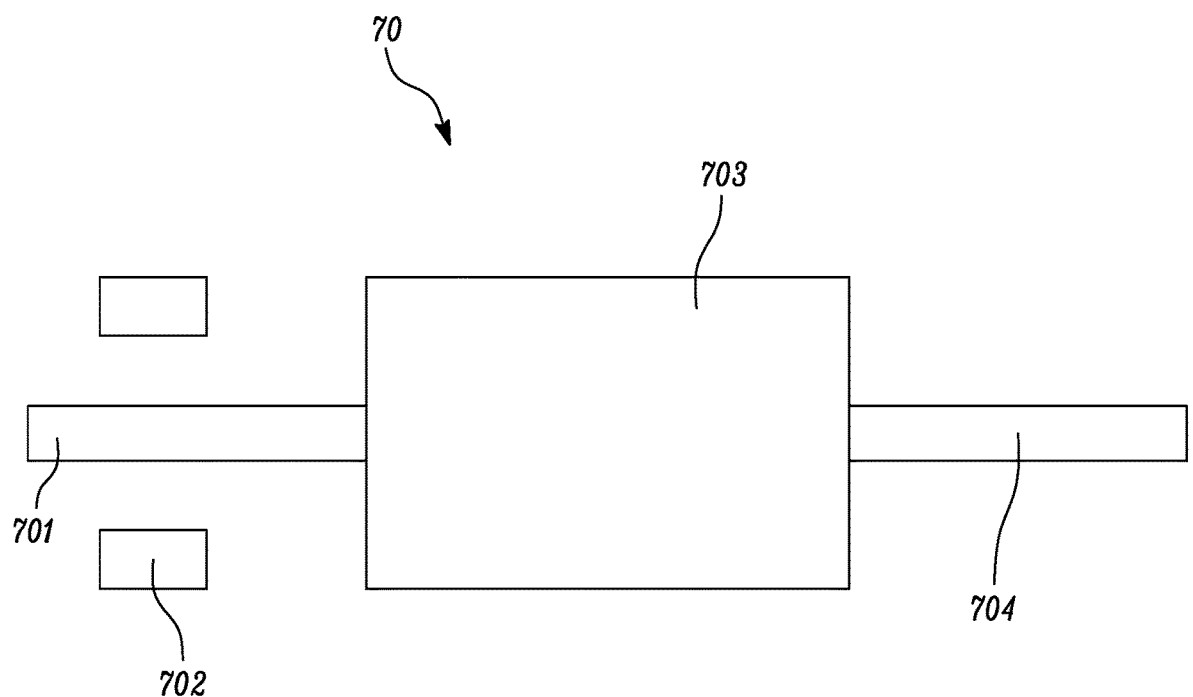
FIG. 7 is an schematic of a drive transfer system.

FIG. 7 shows an example of a drive transfer system 70. The drive transfer system 70 may be suitable for use in or on an aircraft. The drive transfer system 70 may also be suitable for other uses, including, for example, in other transport applications.

The drive transfer system 70 comprises a first drive shaft 701 running on a contactless bearing system 702 and a second drive shaft 704. The first drive shaft 701 and the second drive shaft 704 are connected via a flexible drive coupling 703.

The first drive shaft 701 and the second drive shaft 704 are axially aligned with each other.

The flexible drive coupling 703 has a lower lateral stiffness than the contactless bearing system 702. The flexible drive coupling 703 has a lower axial stiffness than the contactless bearing system 702.

The contactless bearing system 702 may take the form of an air bearing system or a magnetic bearing system. The air bearing system may comprise an air foil bearing system. The air bearing system may comprise an aerostatic bearing system.

The flexible drive coupling 703 may comprise a form metal bellows arrangement. In some embodiments, the flexible drive coupling 703 may comprise a diaphragm, a flexible beam, a flexible jaw pin and bush, a disc pack, a grid coupling, a spring or a magnetic arrangement.

The second drive shaft 704 may run on a mechanical bearing system or a contactless bearing system. The second drive shaft 704 may run on a similar or substantially the same bearing system as the first drive shaft 701.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A cabin blower system, for an aircraft, comprising:
a cabin blower compressor, for compressing air for delivery to a cabin of an aircraft, comprising a compressor drive shaft running on a contactless bearing system; and
a continuously variable transmission comprising an input and an output, the input being arranged to receive power from an engine of the aircraft and the output being arranged to mechanically drive the cabin blower compressor,
wherein the output of the transmission is mechanically coupled with the compressor drive shaft via a flexible drive coupling, the flexible drive coupling disposed between the compressor drive shaft of the cabin blower compressor and the output of the continuously variable transmission.

2. The cabin blower system of claim 1, wherein the contactless bearing system takes the form of an air bearing system or a magnetic bearing system.

3. The cabin blower system of claim 1, wherein the flexible drive coupling has at least one or more of a lower lateral stiffness than the contactless bearing system and a lower axial stiffness than the contactless bearing system.

4. The cabin blower system of claim 1, wherein a mechanical bearing system is disposed near to or at the output of the transmission and the output of the transmission comprises an end of a transmission drive shaft.

5. The cabin blower system of claim 4, wherein the flexible drive coupling is at one end rigidly affixed to the transmission drive shaft and at its other end rigidly affixed to the compressor drive shaft.

6. The cabin blower system of claim 4, wherein the lateral stiffness of the mechanical bearing system is greater than the lateral stiffness of the contactless bearing system and the lateral stiffness of the contactless bearing system is greater than the lateral stiffness of the flexible drive coupling.

7. The cabin blower system of claim 4, wherein the axial stiffness of the mechanical bearing system is greater than the axial stiffness of the contactless bearing system and the axial stiffness of the contactless bearing system is greater than the axial stiffness of the flexible drive coupling.

8. The cabin blower system of claim 1, wherein the flexible drive coupling comprises a form metal bellows arrangement, a diaphragm, a flexible beam, a flexible jaw pin and bush, a disc pack, a grid coupling, a spring or a magnetic arrangement.

9. The cabin blower system of claim 1, wherein the cabin blower system further comprises: a reversible variator arranged to receive power from the gas turbine engine and to output mechanical power to a second transmission input, the reversible variator being operable to output in both forward and reverse directions of rotation; and a controller configured to control an output speed and direction of rotation of the reversible variator.

10. The cabin blower system of claim 1, wherein the contactless bearing system comprises an air foil bearing system comprising a thrust runner having first and second sides and a thrust air foil bearing disposed on both of the first and second sides of the thrust runner.

11. A gas turbine engine comprising the cabin blower system of claim 1.

12. An aircraft comprising the cabin blower system of claim 1.

\* \* \* \* \*